(12) United States Patent
Yamamoto

(10) Patent No.: US 6,882,957 B2
(45) Date of Patent: Apr. 19, 2005

(54) METHOD FOR CALCULATING PHYSICAL PROPERTIES, PHYSICAL PROPERTIES CALCULATING APPARATUS, AND COMPUTER PROGRAM PRODUCT

(75) Inventor: Tomoyuki Yamamoto, Ibaraki (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 10/745,438

(22) Filed: Dec. 23, 2003

(65) Prior Publication Data
US 2004/0138830 A1 Jul. 15, 2004

(30) Foreign Application Priority Data
Dec. 27, 2002 (JP) .................................... 2002-382341

(51) Int. Cl.[7] .......................... G06F 19/00; G06F 15/00
(52) U.S. Cl. .................. 702/170; 257/204; 264/241; 428/34.7; 702/32
(58) Field of Search ............... 702/8, 30, 32, 702/33, 41, 42, 97, 170; 250/214; 242/478.1, 534.2; 257/76, 204; 264/241, 513; 428/34.7; 426/383, 392

(56) References Cited

U.S. PATENT DOCUMENTS

| | | | | |
|---|---|---|---|---|
| 5,237,185 A | * | 8/1993 | Udagawa et al. | 257/204 |
| 5,628,950 A | * | 5/1997 | Schrenk et al. | 264/241 |
| 6,096,393 A | * | 8/2000 | Ikeda et al. | 428/34.7 |
| 6,721,661 B1 | * | 4/2004 | Anstey et al. | 702/8 |

OTHER PUBLICATIONS

"Barrier Properties of EVOH at Low Temperatures and Various Humidity", T. Yamamoto et al., TAPPI Polymer, Laminate and Coating, 2000.

"The Use of EVOH in Retorted Film Applications", K. Kita et al. Boston, MA, United States; Sep. 9–12, 2002.

"Kaigai Packaging Jijo—Polymer No Gas Barrier Sei to Ondo (Overseas Packaging Situation—Gas Barrier Properties and Temperature of Polymer)", H. Watanabe, PPS Report No. 25, Oct. 1987, p. 2.

(Continued)

Primary Examiner—John Barlow
Assistant Examiner—John H Le
(74) Attorney, Agent, or Firm—Birch, Stewart, Kolasch, & Birch, LLP.

(57) ABSTRACT

A physical properties calculating apparatus accepts inputs of material and thickness of an intermediate layer, accepts inputs of material and thickness of an outer layer, accepts inputs of material and thickness of an inner layer, accepts an input of outside air humidity, accepts an input of inside humidity, accepts an input of outside air temperature, calculates the moisture content of the intermediate layer by activating a sub-routine for calculating the moisture content of the intermediate layer based on the accepted various information and preset information, and calculates physical properties such as oxygen transmission rate of the intermediate layer based on the calculated moisture content of the intermediate layer and the accepted outside air temperature. It is possible to know the physical properties of the intermediate layer that forms a packaging material for packaging products to be packaged, such as foods, without actually measuring the physical properties.

8 Claims, 12 Drawing Sheets

OTHER PUBLICATIONS

"Ethylene–Vinyl Alcohol Kyodogo Raminate Film No Sansotoukasei (Oxygen Permeability of Ethylene–Vinyl Alcohol Gopolymer Laminated Film)", Y. Ogino et al., Kobunshi Ronbunshu, vol. 35, No. 8, pp. 487–492 (Aug., 1978).

"Factors Affecting Performance of EVOH Composite Containers in Retort Applications", H. (Jim) Okata et al., COEX '87 '321 (1987).

"Retortable Food Packages Containing Water–Sensitive Oxygen Barrier", M.M. Alger et al., pp. 204–224 (1990 American Chemical Society, Cpt. 10).

"EVOH Tasouhouzai no Retort Tekisei ni kannsuru Sanso Toukado Simulation Program (Oxygen Permeability Simulation Program for Suitability for Retorting of EVOH Composite Containers", Y. Wada et al. (of Kuraray Co., Ltd.), copy Oct. 4, 1996.

"Calculation of Film's Barrier Properties" URL:http://www2s.biglobe.ne.jp/–tcfk/index.html, Dec. 12, 2002.

* cited by examiner

METHOD FOR CALCULATING PHYSICAL PROPERTIES, PHYSICAL PROPERTIES CALCULATING APPARATUS, AND COMPUTER PROGRAM PRODUCT

This Nonprovisional application claims priority under 35 U.S.C. § 119(a) on patent application No.(s). 2002-382341 filed in JAPAN on Dec. 27, 2002, the entire contents of which are hereby incorporated by reference.

BACKGROUND OF THE INVENTION

1. Field of the Invention

The present invention relates to a method for calculating physical properties, and more specifically relates to a physical properties calculating method for calculating physical properties of a packaging material composed of a plurality of layers; a physical properties calculating apparatus adopting the method; and a computer program product for realizing the apparatus by a general-purpose computer system. In particular, the present invention relates to a physical properties calculating method, a physical properties calculating apparatus and a computer program product, for calculating the oxygen transmission rate as a physical property of an intermediate layer of the packaging material, which is made of, for example, ethylene-vinyl alcohol copolymer.

2. Description of Related Art

Ethylene-vinyl alcohol copolymer (hereinafter referred to as EVOH) has excellent gas barrier properties and is therefore widely used as a packaging material for packaging products to be packaged, such as foods.

The EVOH as a packaging material is formed as an intermediate layer which is sandwiched between an inner layer and an outer layer which are produced by molding resins such as polypropylene and polyethylene.

The oxygen transmission rate of the EVOH layer is an important element when packaging, especially, foods, and knowing the oxygen transmission rate of the EVOH layer is an essential condition to design the packaging material.

In the case where food is packaged by the packaging material, treatment including heating or the like for sterilization, more specifically retorting for performing sterilization at temperature around 120 degree centigrade for around several minutes to several hours, is carried out. However, when retorting is performed, the EVOH layer has such a characteristic that the oxygen transmission rate of the EVOH layer increases significantly once and then decreases gradually.

Conventionally, the oxygen transmission rate of EVOH layer is known by measurement or calculation from given conditions. For example, the "Calculation of Film's Barrier Properties" (searched on-line at URL:http://www2s.biglobe.ne.jp/~tcfk/index. html, on Dec. 12, 2002) discloses a physical properties calculating apparatus for calculating the oxygen transmission rate of EVOH layer from the intermediate layer, inner layer, outer layer, and outside air humidity.

However, there is a problem that it is not easy to measure physical properties such as oxygen transmission rate of the EVOH layer serving as an intermediate layer.

Moreover, the physical properties calculating method disclosed in the above reference does not take into account the influence of temperature, and therefore there is a problem that this method is less practicable as a physical properties calculating method for calculating the oxygen transmission rate of EVOH layer for use in a packaging material which may be stored under low temperature conditions such as in freezers and refrigerators, or exposed to high temperatures in summer.

Furthermore, since the physical properties calculating method disclosed in the above reference does not calculate the change with time in the oxygen transmission rate during retorting, and there is a problem that this method is less practicable as a physical properties calculating method for calculating the oxygen transmission rate of EVOH layer for use in a packaging material for packaging food which requires retorting.

BRIEF SUMMARY OF THE INVENTION

The present invention has been made with the aim of solving the above problems, and it is a principal object of the present invention to provide a physical properties calculating method capable of calculating physical properties such as oxygen transmission rate of an intermediate layer, based on conditions such as the material and thickness of an intermediate layer, the materials and thicknesses of an inner layer and an outer layer, and ambient humidity and temperature by using equations showing the relations among them, and thereby obtaining highly practicable physical properties calculation results that take into account not only the influence of humidity but also the influence of temperature, and to provide a physical properties calculating apparatus adopting the method, and a computer program product for realizing the apparatus by a general-purpose computer system.

It is also an object of the present invention to provide a physical properties calculating apparatus capable of calculating the change with time in the oxygen transmission rate during treatment such as retorting of a packaging material and after the end of treatment, based on conditions such as the material and thickness of the intermediate layer, the materials and thicknesses of the inner layer and outer layer, and ambient humidity and temperature by using equations showing the relations among them.

According to the physical properties calculating method of the present invention, there is provided a method for calculating physical properties using a physical properties calculating apparatus which comprises inputting means, storing means previously storing equations and constants used for calculating physical properties, and calculating means, and calculates physical properties of an intermediate layer sandwiched between a layer on one side and a layer on other side of a packaging material composed of a plurality of layers, characterized by comprising the steps of: accepting material and thickness of the layer on one side, material and thickness of the layer on the other side, and humidity and temperature on the one side and the other side, by the physical properties calculating apparatus through the inputting means; calculating humidity of the intermediate layer by the calculating means of the physical properties calculating apparatus with use of the equations and constants previously storing in the storing means, based on material and thickness of the layer on one side, material and thickness of the layer on the other side, and humidity and temperature on the one side and the other side; and calculating physical properties of the intermediate layer by the calculating means of the physical properties calculating apparatus with use of the equations and constants previously stored in the storing means, based on the calculated humidity of the intermediate layer.

In the physical properties calculating method of the present invention, by calculating physical properties such as oxygen transmission rate of an EVOH layer used as an intermediate layer of a packaging material for packaging products to be packaged, such as foods, based on conditions such as the material and thickness of the intermediate layer, the material and thickness of the layer on one side and the layer on the other side, and ambient humidity and temperature by using equations showing the relations among them, it is possible to know the physical properties without actually producing samples of packaging material and measuring them. Thus, since the physical properties calculating method of the present invention can support determination of conditions for designing the packaging material and calculate physical properties by taking into account external environment conditions such as ambient temperature and humidity, it is possible to know the physical properties such as oxygen transmission rate of the intermediate layer, taking into account the actual use environment such as in a freezer, a refrigerator, or a room in summer.

According to a first aspect of the physical properties calculating apparatus of the present invention, there is provided a physical properties calculating apparatus for calculating physical properties of an intermediate layer sandwiched between a layer on one side and a layer on other side of a packaging material composed of a plurality of layers, characterized by comprising: storing means for previously storing equations and constants used for calculating physical properties; inputting means for accepting material and thickness of the intermediate layer; inputting means for accepting material and thickness of the layer on one side; inputting means for accepting material and thickness of the layer on the other side; inputting means for accepting humidity on the one side; inputting means for accepting humidity on the other side; inputting means for accepting outside air temperature; and calculating means for calculating physical properties of the intermediate layer by using the equations and constants previously stored in the storing means, based on the accepted material and thickness of the intermediate layer, the accepted material and thickness of the layer on one side, the accepted material and thickness of the layer on the other side, the accepted humidity on the one side, the accepted humidity on the other side, and the accepted outside air temperature.

In the first aspect of the physical properties calculating apparatus of the present invention, by calculating physical properties such as oxygen transmission rate of the intermediate layer of a packaging material for packaging products to be packaged, such as foods, based on conditions such as the material and thickness of the intermediate layer, the materials and thicknesses of the layer on one side and the layer on the other side, the humidity on one side indicating outside air humidity, the humidity on the other side indicating inside humidity, and outside air temperature by using equations showing the relations among them, it is possible to know the physical properties without actually producing samples of packaging material and measuring them. Thus, since the physical properties calculating apparatus of the present invention can support determination of conditions for designing the packaging material and calculate physical properties by taking into account external environment conditions such as ambient temperature and humidity, it is possible to know the physical properties such as oxygen transmission rate of the intermediate layer, taking into account the actual use environment such as in a freezer, a refrigerator, or a room in summer.

According to a second aspect of the physical properties calculating apparatus of the present invention, in the first aspect, the apparatus is characterized in that the calculating means comprises: means for calculating a water vapor transmission rate of the layer on one side by using the equations and constants previously stored in the storing means, based on the accepted material of the layer on one side, the accepted humidity on the one side, and the accepted outside air temperature; means for calculating a water vapor transmission rate of the layer on the other side by using the equations and constants previously stored in the storing means, based on the accepted material of the layer on the other side, the accepted humidity on the other side, and the accepted outside air temperature; means for calculating humidity of the intermediate layer by using the equations and constants previously stored in the storing means, based on accepted outside air humidity, the calculated water vapor transmission rate and accepted thickness of the layer on one side, preset humidity, and the calculated water vapor transmission rate and accepted thickness of the layer on the other side; means for calculating a moisture content of the intermediate layer by using the equations and constants previously stored in the storing means, based on the calculated humidity of the intermediate layer, the accepted outside air temperature and the accepted material of the intermediate layer; and means for calculating an oxygen transmission rate of the intermediate layer by using the equations and constants previously stored in the storing means, based on the calculated moisture content of the intermediate layer and the accepted outside air temperature.

In the second aspect of the physical properties calculating apparatus of the present invention, the water vapor transmission rate of the layer on one side that is to be an outer layer in packaging and the water vapor transmission rate of the layer on the other side that is to be an inner layer are calculated based on known equations showing the temperature dependence of water vapor transmission rate of the outer layer and that of the inner layer.

Further, the humidity of the intermediate layer, that is, the intermediate layer of packaging material for packaging products to be packaged, such as foods, is calculated, based on known equations, from the outside air humidity in contact with the outer layer, the water vapor transmission rate and thickness of the outer layer, the humidity on the product side in contact with the inner layer, and the water vapor transmission rate and thickness of the inner layer.

Next, the moisture content of the intermediate layer is calculated by equations showing that the logarithm of the solubility coefficient of water in the intermediate layer is proportional to humidity, that the logarithm of the solubility coefficient of water in the intermediate layer is proportional to the inverse of absolute temperature, and that the logarithm of the solubility coefficient of water in the intermediate layer is proportional to the ethylene composition of the intermediate layer.

Next, the oxygen transmission rate of the intermediate layer is calculated based on an equation expressing the logarithm of oxygen transmission rate proportional to the inverse of absolute temperature as a polynomial of moisture content.

Consequently, it is possible to know the physical properties of the intermediate layer without actually producing samples of packaging material and measuring them. Accordingly, since the physical properties calculating apparatus of the present invention can support determination of conditions for designing the packaging material and calculate physical properties by taking into account external environmental conditions such as temperature and humidity, it is possible to know the physical properties such as oxygen transmission rate of the intermediate layer, taking into account the actual use environment such as in a freezer, a refrigerator, or a room in summer.

According to a third aspect of the physical properties calculating apparatus of the present invention, in the first aspect, the apparatus is characterized by further comprising: inputting means for accepting a treatment time of the packaging material; inputting means for accepting a treatment temperature of the packaging material; and inputting means for accepting a time after end of treatment, wherein the calculating means comprises: means for calculating a relation between time and moisture content of the intermediate layer during treatment of the packaging material by using the equations and constants previously stored in the storing means, based on the accepted material and thickness of the layer on one side or the accepted material and thickness of the layer on the other side, the accepted material and thickness of the intermediate layer, and the accepted treatment temperature; means for calculating a moisture content of the intermediate layer just after treatment by using the equations and constants previously stored in the storing means, based on the calculated relation between time and moisture content of the intermediate layer during treatment, and the accepted treatment time; means for calculating a water vapor transmission rate of the layer on one side, based on the accepted material of the layer on one side by using the equations and constants previously stored in the storing means, the accepted humidity on the one side, and the accepted outside air temperature; means for calculating a water vapor transmission rate of the layer on the other side by using the equations and constants previously stored in the storing means, based on the accepted material of the layer on the other side, the accepted humidity on the other side, and the accepted outside air temperature; means for calculating humidity of the intermediate layer by using the equations and constants previously stored in the storing means, based on accepted outside air humidity, the calculated water vapor transmission rate and accepted thickness of the layer on one side, the accepted humidity on the other side, the calculated water vapor transmission rate and accepted thickness of the layer on the other side; means for calculating a moisture content of the intermediate layer by using the equations and constants previously stored in the storing means, based on the calculated humidity of the intermediate layer, the accepted outside air temperature, and the accepted material of the intermediate layer; means for calculating a relation between time and moisture content of the intermediate layer after end of treatment of the packaging material by using the equations and constants previously stored in the storing means, based on the calculated moisture content of the intermediate layer, the calculated moisture content of the intermediate layer just after treatment, the calculated water vapor transmission rate of the layer on one side, the calculated water vapor transmission rate of the layer on the other side, the accepted thickness of the intermediate layer, the accepted material of the intermediate layer, and the accepted time after end of treatment; and means for calculating a relation between time and oxygen transmission rate of the intermediate layer by using the equations and constants previously stored in the storing means, based on the calculated relation between time and moisture content of the intermediate layer during treatment of the packaging material, and the calculated relation between time and moisture content of the intermediate layer after end of treatment of the packaging material.

In the third aspect of the physical properties calculating apparatus of the present invention, the relation between time and moisture content of the intermediate layer during treatment is calculated by equations obtained by experiments, based on the thicknesses and materials of the layer on one side that is to be an outer layer in packaging and the layer on the other side that is to be an inner layer, the thickness and material of the intermediate layer, and the temperature of treatment such as retorting.

Further, the relation between time and moisture content of the intermediate layer after the end of treatment of the packaging material is calculated by an equation obtained by experiments, based on the calculated moisture content of the intermediate layer, the calculated moisture content just after treatment, the calculated water vapor transmission rate of the layer on one side, the calculated water vapor transmission rate of the layer on the other side, the accepted thickness of the intermediate layer, the accepted material of the intermediate layer, and the accepted time after end of treatment.

Next, an equation showing the change with time in the oxygen transmission rate of the intermediate layer during treatment and after the end of treatment is calculated using an equation showing the relation between the moisture content of the intermediate layer and oxygen transmission rate.

Consequently, it is possible to know the physical properties of the intermediate layer without actually producing samples of packaging material and measuring them. Accordingly, since the physical properties calculating apparatus of the present invention can know the change with time in the oxygen transmission rate after the end of treatment such as retorting of the packaging material, it is possible to calculate a storage period of food as a packaged product.

According to the computer program product of the present invention, there is provided a computer program product for use with a computer system including inputting means, and storing means previously storing equations and constants used for calculating physical properties, characterized by comprising: a computer usable storage medium having a computer readable program code embodied therein for calculating physical properties of an intermediate layer sandwiched between a layer on one side and a layer on other side of a packaging material composed of a plurality of layers, the computer readable program code comprising: causing a computer to accept through the inputting means material and thickness of the intermediate layer; causing a computer to accept through the inputting means material and thickness of the layer on one side; causing a computer to accept through the inputting means material and thickness of the layer on the other side; causing a computer to accept through the inputting means humidity; causing a computer to accept through the inputting means temperature; and causing a computer to calculate physical properties of the intermediate layer by using the equations and constants previously stored in the storing means, based on the accepted material and thickness of the intermediate layer, the accepted material and thickness of the layer on one side, the accepted material and thickness of the layer on the other side, and the accepted humidity and temperature.

In the computer program product of the present invention, by causing a general-purpose computer system to execute the computer program product, the general-purpose computer system is operated as the physical properties calculating apparatus of the present invention.

The above and further objects and features of the invention will more fully be apparent from the following detailed description with accompanying drawings.

DETAILED DESCRIPTION OF THE PREFERRED EMBODIMENTS

The following description will explain the present invention in detail based on the drawings illustrating some embodiments thereof.

Figure 1:
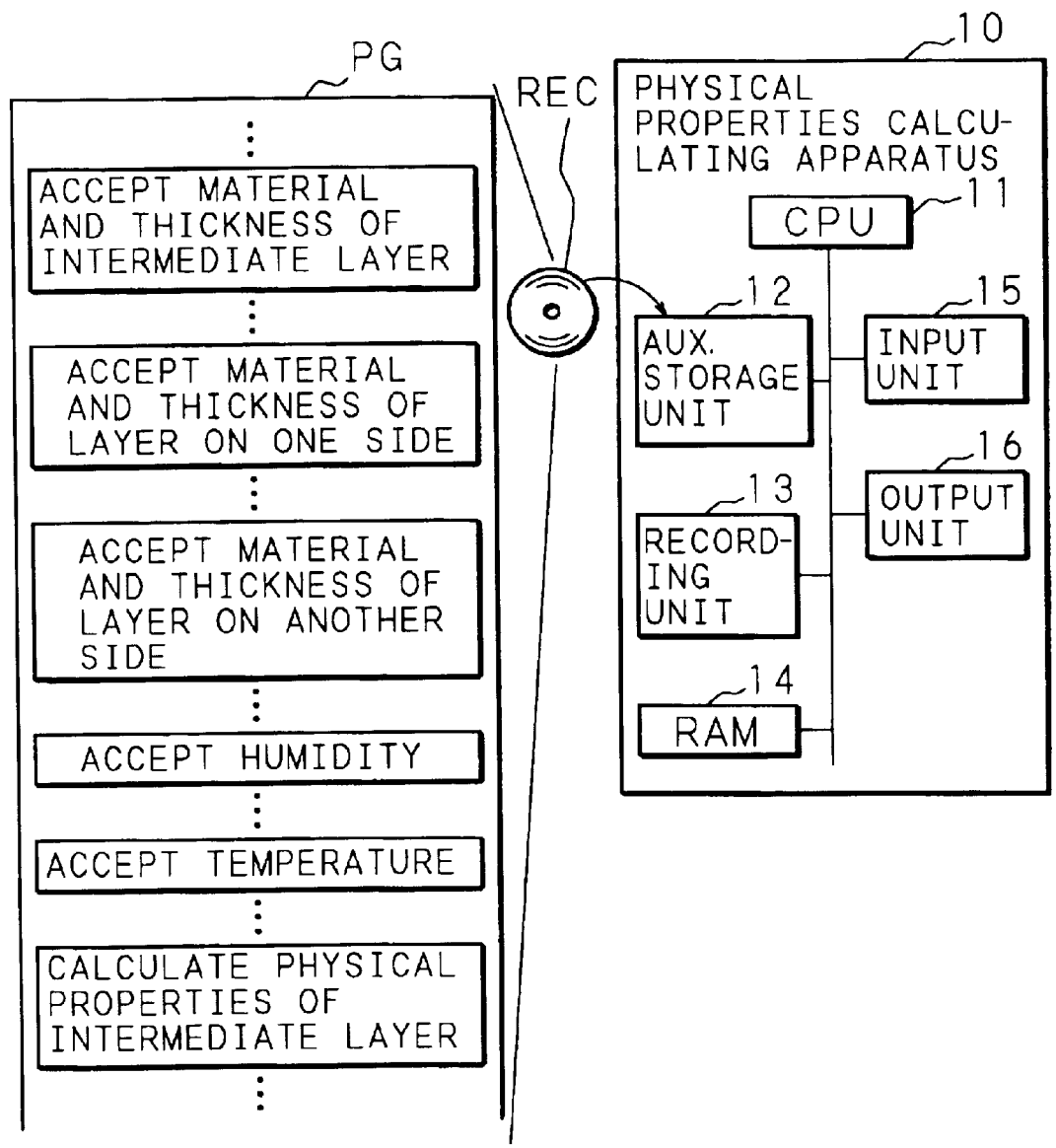
FIG. 1 is a block diagram showing an example of the configuration of a physical properties calculating apparatus of the present invention.

FIG. 1 is a block diagram showing an example of the configuration of a physical properties calculating apparatus of the present invention.

In FIG. 1, numeral 10 represents a general-purpose computer as a physical properties calculating apparatus of the present invention.

The physical properties calculating apparatus 10 comprises a CPU 11 for controlling the entire apparatus; an auxiliary storage unit 12 such as a CD-ROM drive for reading various information from a recording medium REC such as a CD-ROM on which various information such as a computer program PG for the physical properties calculating apparatus of the present invention and data are recorded; a recording unit 13 such as a hard disk for recording various information such as the computer program PG and data read by the auxiliary storage unit 12; and a RAM 14 for temporarily storing information for use in various processes.

By reading various information such as the computer program PG of the present invention and data from the recording unit 13, storing them in the RAM 14 and executing various procedures contained in the computer program PG by the CPU 11, the general-purpose computer operates as the physical properties calculating apparatus 10 of the present invention and calculates physical properties of ethylene-vinyl alcohol copolymer (hereinafter referred to as EVOH) which is widely used in packaging materials with laminated structure for packaging products to be packaged, such as foods.

Note that various information recorded in the recording unit 13 includes information such as various equations and constants for use in the calculation of physical properties as described later.

Moreover, the physical properties calculating apparatus 10 comprises an input unit 15 such as a sensor for detecting the values of temperature, humidity, etc., a mouse and a keyboard; and an output unit 16 such as a monitor and a printer.

Next, the following description will explain a method for calculating physical properties, in this case the water vapor transmission rate, of EVOH by the physical properties calculating apparatus 10 of the present invention.

Figure 2:
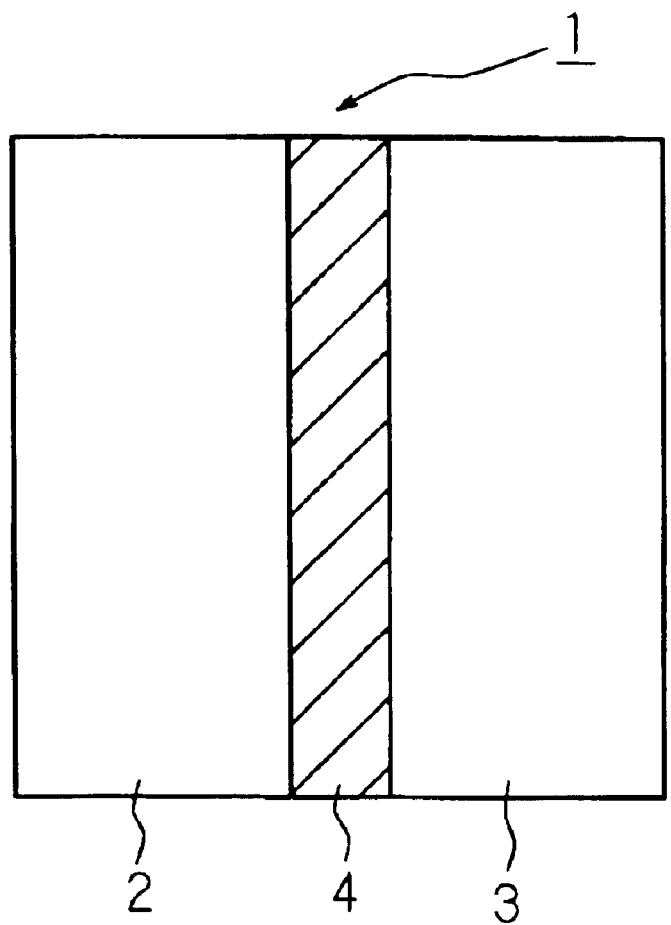
FIG. 2 is a schematic view showing a cross section of a packaging material whose physical properties are to be calculated by the physical properties calculating apparatus of the present invention.

FIG. 2 is a schematic view showing a cross section of a packaging material whose physical properties are to be calculated by the physical properties calculating apparatus 10 of the present invention.

In FIG. 2, numeral 1 represents the packaging material. The packaging material 1 exemplified in FIG. 1 is formed in a three-layer structure composed of a layer 2 on one side that is the left side in FIG. 2, a layer on the other side that is the right side in FIG. 2, and an intermediate layer 4 sandwiched between the two layers 2 and 3.

The layer 2 on one side and the layer 3 on the other side are respectively formed of resin such as polypropylene (PP) or polyethylene (PE), and the intermediate layer 4 is formed of EVOH.

Note that since a product to be packaged is packed by the packaging material 1 with the layer 3 on the other side as the product side and the layer 2 on one side as the outside, the layer 2 on one side and the layer 3 on the other side will be referred to as the outer layer and the inner layer, respectively, in the following explanation.

Figure 3:
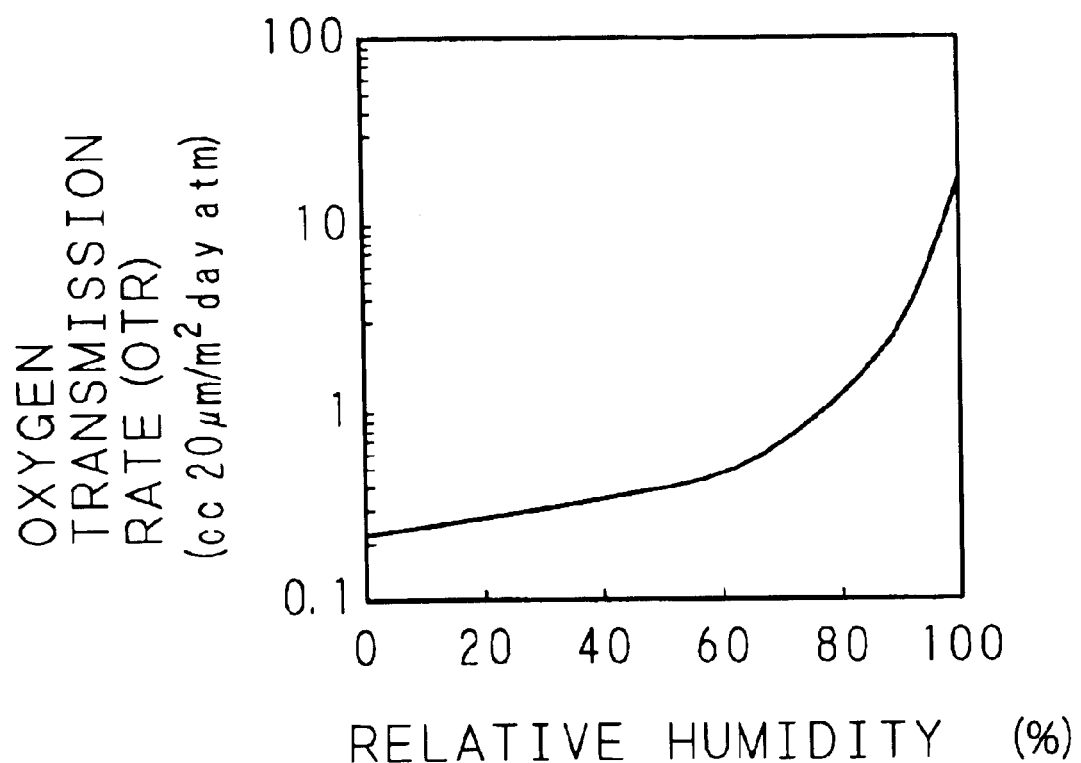
FIG. 3 is a graph showing the humidity dependence of oxygen transmission rate of an intermediate layer whose physical properties are to be calculated by the physical properties calculating apparatus of the present invention.

FIG. 3 is a graph showing the humidity dependence of oxygen transmission rate of the intermediate layer 4 whose physical properties are to be calculated by the physical properties calculating apparatus 10 of the present invention.

The graph of FIG. 3 shows the relation between relative humidity and oxygen transmission rate by plotting the relative humidity (%) on the abscissa and plotting the logarithm of oxygen transmission rate cc 20 $\mu$m/m$^2$ day atm) on the ordinate.

As shown in the graph of FIG. 3, the intermediate layer 4 has such a physical property that the oxygen transmission rate increases abruptly with an increase in the relative humidity.

However, since it is difficult to directly measure the relative humidity of the intermediate layer 4, the relative humidity of the intermediate layer 4 needs to be calculated by using formulas from the water vapor transmission rate and thickness of the outer layer 2, the activity (represented by dividing relative humidity by 100) of outside air in contact with the outer layer 2, the water vapor transmission rate and thickness of the inner layer 3, the activity (represented by dividing relative humidity by 100) of the inside of packaging material 1 in contact with the inner layer 3, and constants $A_1$ and $A_2$ determined by the material.

The humidity dependence of water vapor transmission rate P of the outer layer 2 and inner layer 3 is as shown by equation (1).

$$\log_e P = A_1 + A_2 a \quad (1)$$

where P: water vapor transmission rate a: activity (represented by dividing relative humidity by 100)

$A_1, A_2$: constants.

Further, the temperature dependence of water vapor transmission rate P of the outer layer 2 and inner layer 3 is as shown by equation (2).

$$\log_e P = B_1 + B_2/T \quad (2)$$

where T: absolute temperature $B_1, B_2$: constants.

Note that each of the outer layer 2 and the inner layer 3 may be composed of a plurality of layers, respectively. In the case where the outer layer 2 (or the inner layer 3) is composed of n layers whose respective thicknesses are indicated as $l_1, l_2, \ldots l_i$, the water vapor transmission rate P of the outer layer 2 (or the inner layer 3) as a whole thickness $$L\left(L = \sum_{i=1}^{n} l_i\right)$$

is expressed by equation (3) below.

$$\frac{1}{P} = \frac{1}{p_1} + \frac{1}{p_2} + \ldots + \frac{1}{p_i} = \sum_{i=1}^{n} \frac{1}{p_i} \quad (3)$$

where $p_i$: water vapor transmission rate of the ith layer whose thickness is $l_i$ P: water vapor transmission rate of the whole thickness L of outer layer (or inner layer).

Figure 4:
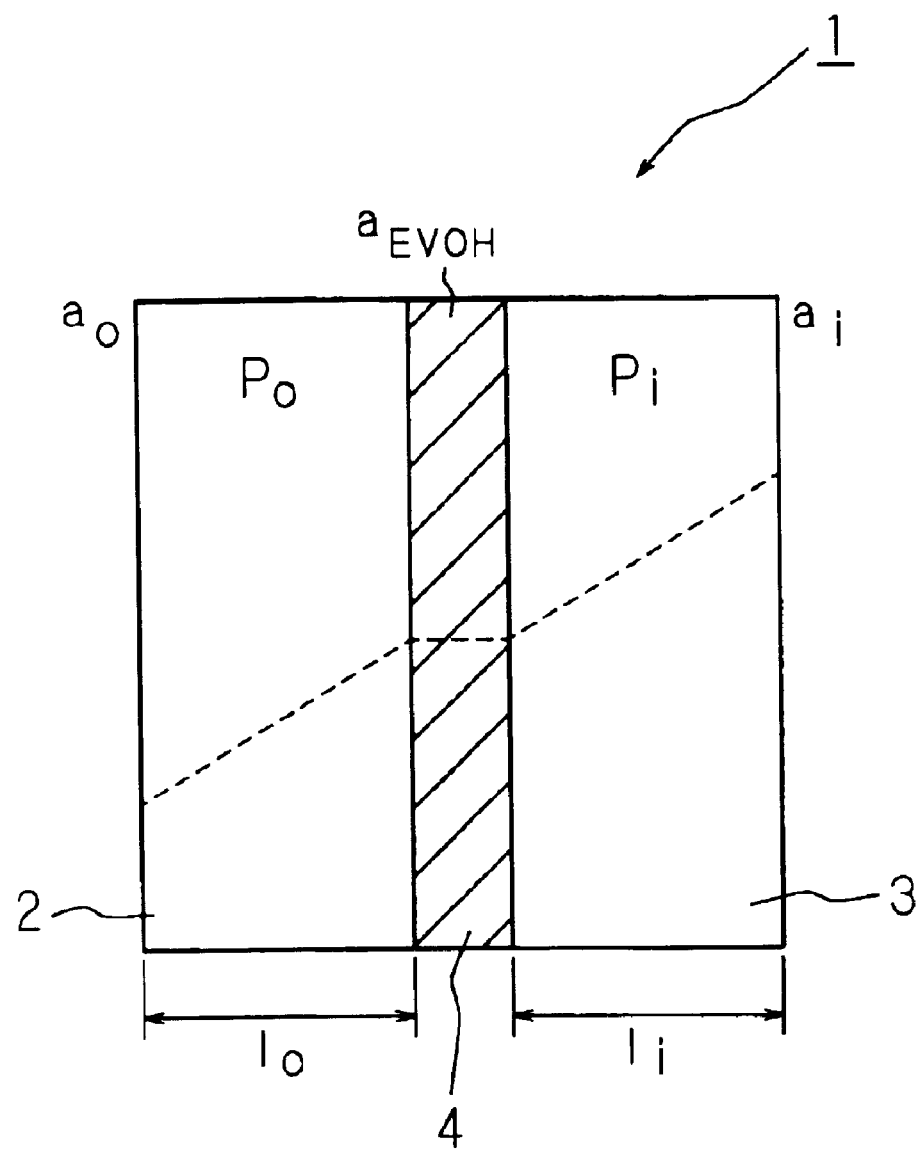
FIG. 4 is a schematic view showing a cross section of a packaging material whose physical properties are to be calculated by the physical properties calculating apparatus of the present invention.

FIG. 4 is a schematic view showing a cross section of the packaging material 1 whose physical properties are to be calculated by the physical properties calculating apparatus 10 of the present invention.

As shown by the broken line in FIG. 4, based on the premises that the relative humidity in the outer layer 2 changes linearly in the direction of thickness $l_o$, the relative humidity in the inner layer 3 changes linearly in the direction of thickness $l_i$ and the relative humidity of the intermediate layer 4 is constant within itself, the relative humidity $a_{EVOH}$ of the intermediate layer 4 is calculated, using equations (4) and (5) shown below, from the water vapor transmission rate $P_o$ of the outer layer 2 and the water vapor transmission rate $P_i$ of the inner layer 3 calculated from equations (1) and (2).

$$a_{EVOH} = \frac{1}{1+y} a_i + \frac{1}{1+y} a_o \quad (4)$$

$$Y = \frac{P_o/l_o}{P_i/l_i} = \frac{P_o l_i}{P_i l_o} \quad (5)$$

$P_o$: water vapor transmission rate of the outer layer $P_i$: water vapor transmission rate of the inner layer $l_o$: thickness of the outer layer $l_i$: thickness of the inner layer $a_o$: activity of outside air $a_i$: activity of inside air $a_{EVOH}$: activity of the intermediate layer Then, the moisture content m of the intermediate layer 4 is calculated, using equations (6) and (7) shown below, from the relative humidity $a_{EVOH}$ of the intermediate layer 4 calculated using equation (4), ethylene composition $E_t$ representing the material of the intermediate layer 4, and constants $C_0, C_1, C_2, C_3, C_4$ determined by the material.

Note that the ethylene composition $E_t$ in equation (7) is the value expressing the ethylene content in EVOH that forms the intermediate layer 4 as mol percentage.

In addition, the constants $C_0, C_1, C_2, C_3, C_4$ are values in the case where the moisture content is regressed to equation (7) by using the activity at absolute temperature.

$$m = SP_o \cdot a_{EVOH} \quad (6)$$

$$= C_0 \exp(C_1 \cdot a_{EVOH}) \exp\left(\frac{C_2}{T} \cdot a_{EVOH}\right) \cdot$$

$$\exp\left(\frac{C_3}{T}\right) \exp(C_4 \cdot Et) P_o \cdot a_{EVOH}$$

$$\log_e P_o = 17.50 - \frac{2944}{T} - \frac{4.864 \times 10^5}{T^2} + \frac{2.693 \times 10^7}{T^3} \quad (7)$$

where m: moisture content

S: solubility coefficient $P_o$: saturated vapor pressure $a_{EVOH}$: activity of the intermediate layer T: absolute temperature $E_t$: ethylene composition $C_0, C_1, C_2, C_3, C_4$: constants.

Here, equation (6) is an equation obtained based on the relation between the solubility coefficient of water in EVOH and relative humidity, the relation between the solubility coefficient of water in EVOH and absolute temperature, and the relation between the solubility coefficient of water in EVOH and ethylene composition. Note that these relations were found by experiments performed by the inventors of this application.

Figure 5A:
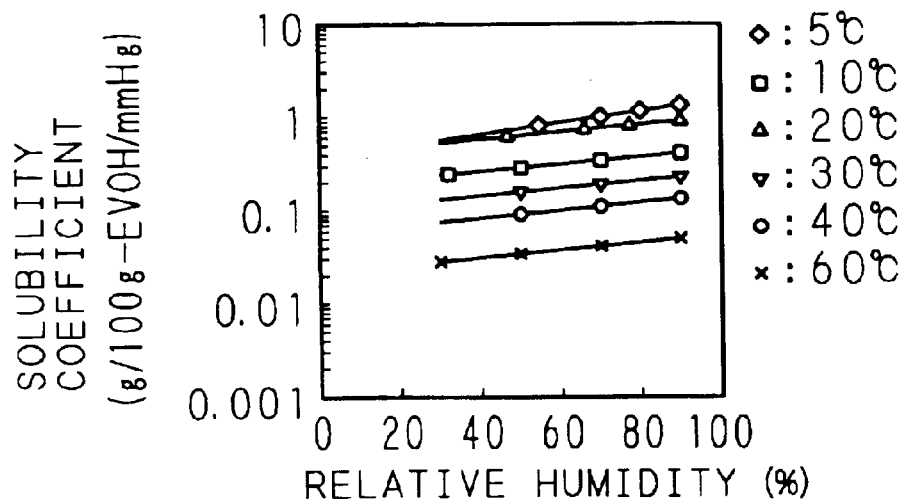
FIG. 5A, FIG. 5B and FIG. 5C are graphs showing the characteristics of EVOH that forms an intermediate layer whose physical properties are to be calculated by the physical properties calculating apparatus of the present invention.
Figure 5B:
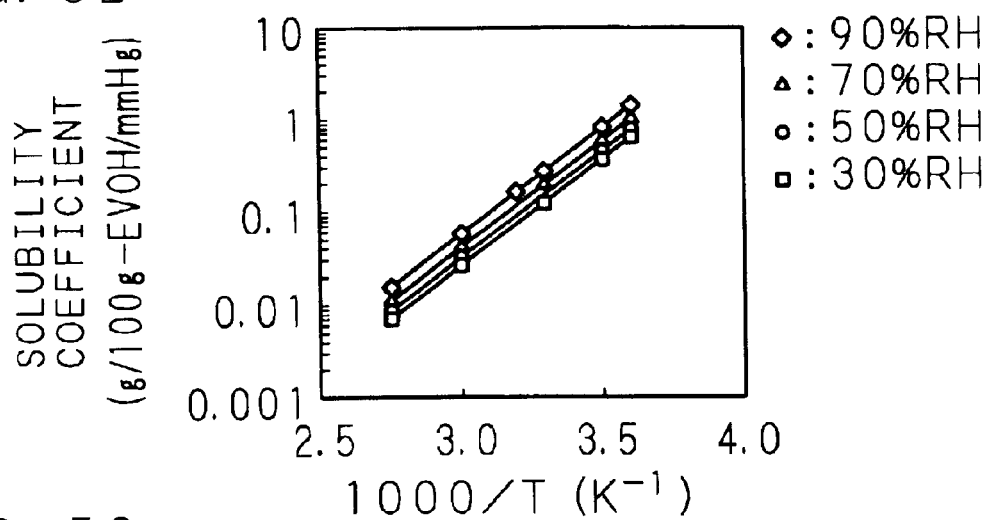
Figure 5C:
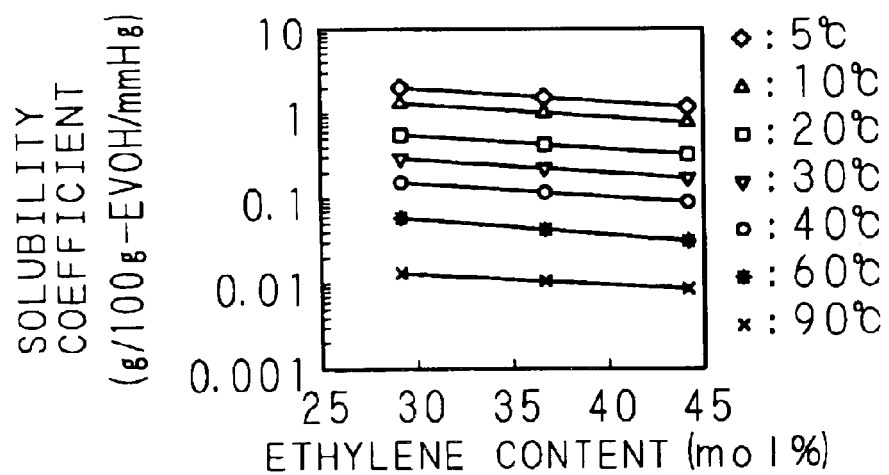

FIG. 5A, FIG. 5B and FIG. 5C are graphs showing the characteristics of EVOH that forms the intermediate layer 4 whose physical properties are to be calculated by the physical properties calculating apparatus 10 of the present invention.

FIG. 5A is a graph showing the relation between relative humidity and the solubility coefficient of water in EVOH for each temperature by plotting the relative humidity (%) on the abscissa and plotting the logarithm of the solubility coefficient of water in EVOH (g/100 g-EVOH/mmHg) on the ordinate. It is shown in FIG. 5A that there is a proportional relation between relative humidity and the logarithm of the solubility coefficient of water in EVOH, and that the lower the temperature, the higher the solubility coefficient.

FIG. 5B is a graph showing the relation between absolute temperature and the solubility coefficient of water in EVOH for each temperature by plotting the inverse ($K^{-1}$) of absolute temperature (K) on the abscissa and plotting the logarithm of the solubility coefficient of water in EVOH (g/100 g-EVOH/mmHg) on the ordinate. It is shown in FIG. 5B that there is a proportional relation between the inverse of absolute temperature and the logarithm of the solubility coefficient of water in EVOH, and that the higher the relative humidity, the higher the solubility coefficient.

FIG. 5C is a graph showing the relation between ethylene composition and the solubility coefficient of water in EVOH for each temperature by plotting the ethylene composition (content) (mol %) on the abscissa and plotting the logarithm of the solubility coefficient of water in EVOH on the ordinate. It is shown in FIG. 5C that there is a proportional relation between the ethylene composition and the logarithm of the solubility coefficient of water in EVOH, and that the lower the temperature, the higher the solubility coefficient.

Thus, equation (6) was found from the relations between the solubility coefficient and various conditions obtained from the experiments.

Further, the oxygen transmission rate as a physical property of the intermediate layer 4 is calculated, using equations (8) or (9) shown below, from the moisture content obtained by equation (6). Note that constants $D_0$, $D_1$, $D_2$ and $E_0$, $E_1$, $E_2$, $E_3$, $E_4$ in equations (8) and (9) are coefficients in the case where relation among oxygen transmission rate, moisture content and temperature is approximated using following equations (8) and (9).

Low humidity side $$OTR = D_0 \exp\left(\frac{D_1}{T}\right) \exp\left(\frac{D_2 m}{T}\right) \tag{8}$$

High humidity side $$OTR = E_0 \exp\left(E_1 \frac{1}{T}\right) \exp\left(E_2 \frac{m}{T}\right) \cdot \exp\left\{E_3 \left(\frac{m}{T}\right)^2\right\} \exp\left\{E_4 \left(\frac{m}{T}\right)^3\right\} \tag{9}$$

where OTR: oxygen transmission rate
T: absolute temperature
m: moisture content
$D_0$, $D_1$, $D_2$: constants
$E_0$, $E_1$, $E_2$, $E_3$, $E_4$: constants.

Here, equations (8) and (9) are equations obtained based on the relations between the oxygen transmission rate OTR and the moisture content m and absolute temperature T. Note that these relations were found by the experiments performed by the inventors of this application. However, for the reason described later, either of equations (8) and (9) is selected based on the moisture content m.

Figure 6A:
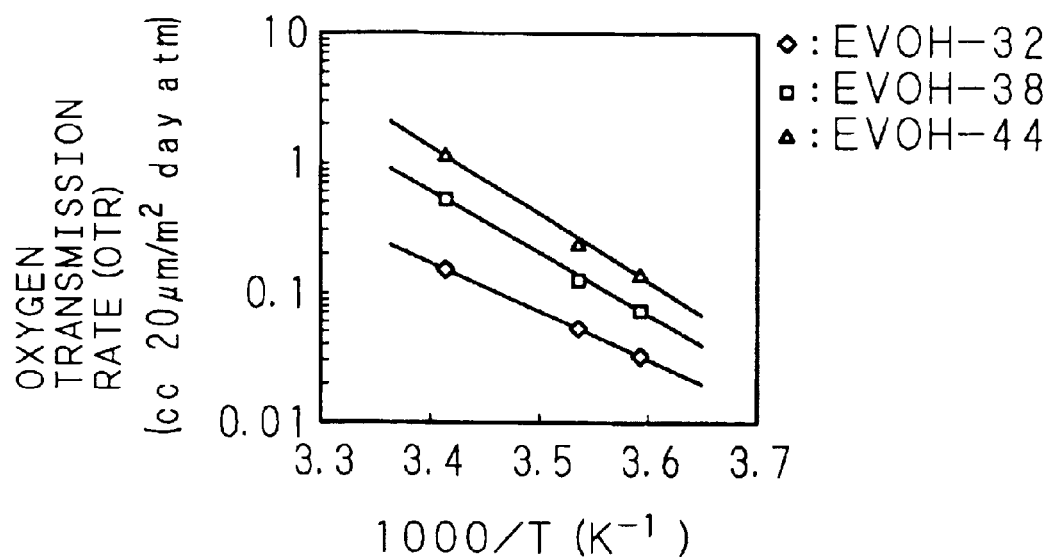
FIG. 6A and FIG. 6B are graphs showing the characteristics of EVOH that forms an intermediate layer whose physical properties are to be calculated by the physical properties calculating apparatus of the present invention.
Figure 6B:
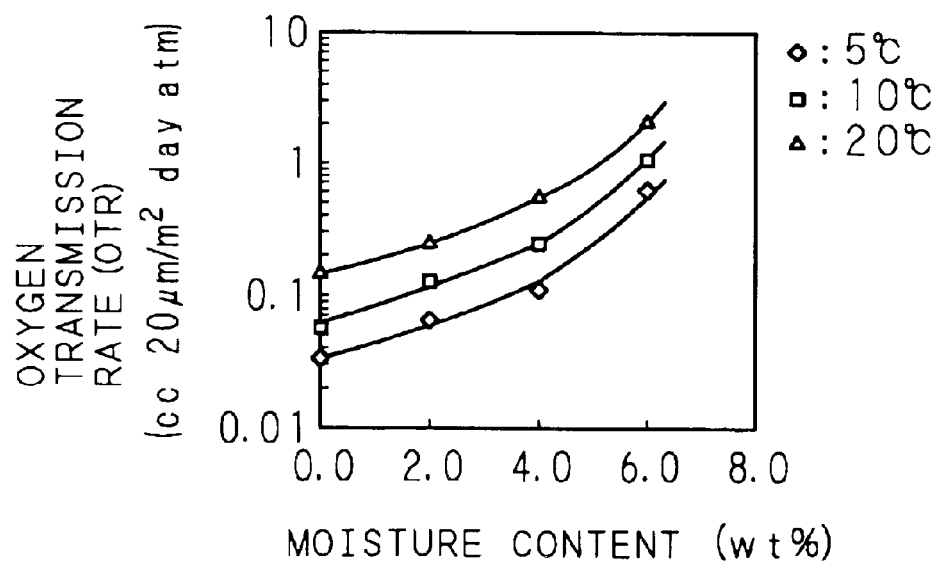

FIG. 6A and FIG. 6B are graphs showing the characteristics of EVOH that forms the intermediate layer 4 whose physical properties are to be calculated by the physical properties calculating apparatus 10 of the present invention.

FIG. 6A is a graph showing the relation between absolute temperature and oxygen transmission rate for each ethylene composition by plotting the inverse of the absolute temperature on the abscissa and plotting the logarithm of the oxygen transmission rate on the ordinate. It is shown in FIG. 6A that there is a proportional relation between the inverse of the absolute temperature and the logarithm of the oxygen transmission rate, and that the higher the ethylene content, the higher the oxygen transmission rate.

FIG. 6B is a graph showing the relation between moisture content and oxygen transmission rate for each temperature by plotting the moisture content on the abscissa and plotting the logarithm of the oxygen transmission rate on the ordinate.

A point to be focused in the graph of FIG. 6B is that there is a difference in the above-mentioned relation between the low humidity side where the moisture content is lower than 4.0 wt % and the high humidity side where the moisture content is higher than 4.0 wt %. This is the reason why the relation between the oxygen transmission rate and the moisture content and absolute temperate found from the relations of FIG. 6A and FIG. 6B is expressed by two different equations, namely equations (8) and (9).

Specifically, when the moisture content is lower than 4.0 wt %, it is judged to be low humidity, and equation (8) is selected. On the other hand, when the moisture content is higher than 4.0 wt %, it is judged to be high humidity, and equation (9) is selected.

Note that the method using different equations for the low humidity side and the high humidity side, respectively, based on 4.0 wt % as a criterion is a method that is applied only to the calculation of physical properties of EVOH having ethylene composition shown in FIG. 6A. Needless to say, when calculating physical properties of EVOH of different compositions, or physical properties of other materials, the value used as a criterion for judging the low humidity side and high humidity side varies. Accordingly, in such cases, two or more criteria may be prepared according to a physical property to be calculated, and three or more equations may be used, or, on the contrary, the physical property may be expressed by one equation.

In the above-mentioned manner, the oxygen transmission rate as a physical property of the intermediate layer 4 can be calculated.

Next, the following description will explain a method for calculating the change with time of physical properties, in this case the oxygen transmission rate, of EVOH by the physical properties calculating apparatus 10 of the present invention.

For the packaging material 1 for packaging products to be packaged, such as foods, treatment, such as retorting for performing sterilization at temperature around 120 degree centigrade, is executed in the state in which food is packaged within the packaging material 1. Therefore, it is desirable to find the change with time in the oxygen transmission rate caused by treatment.

The relation between the moisture content of the intermediate layer 4 and time during treatment (retorting in this case) is calculated, using equations (10), (11), (12) and (13) shown below, from the treatment temperature T, the thickness of the intermediate layer 4, constants $f_1$, $f_2$, $f_3$, $f_4$, $g_1$, $g_2$, $g_3$, $g_4$ and $h_1$, $h_2$, $h_3$, $h_4$ which are determined by the thicknesses and materials of the outer layer 2 and inner layer 3.

$$m = F[1 - \exp(G)] + H \tag{10}$$

$$F = f_1 T + \frac{f_2}{t_{oi}} - \frac{f_3}{t_{EVOH}} + f_4 \tag{11}$$

$$G = g_1 T + \frac{g_2}{t_{oi}} - \frac{g_3}{t_{EVOH}} + g_4 \tag{12}$$

$$H = h_1 T + \frac{h_2}{t_{oi}} - \frac{h_3}{t_{EVOH}} + h_4 \tag{13}$$

where m: moisture content
t: time
T: temperature (Centigrade)
$t_{oi}$: thickness of the outer layer or inner layer
$t_{EVOH}$: thickness of the intermediate layer
$f_1$, $f_2$, $f_3$, $f_4$: constants
$g_1$, $g_2$, $g_3$, $g_4$: constants
$h_1$, $h_2$, $h_3$, $h_4$: constants.

Here, equations (10), (11), (12) and (13) are equations obtained based on the relation between moisture content m and time t during treatment. Note that these relations were found by experiments performed by the inventors of this application.

In addition, constants $f_1$, $f_2$, $f_3$, $f_4$, $g_1$, $g_2$, $g_3$, $g_4$ and $h_1$, $h_2$, $h_3$, $h_4$ are obtained by regressing the result of above mentioned experiments by equations (10) through (13).

Figure 7:
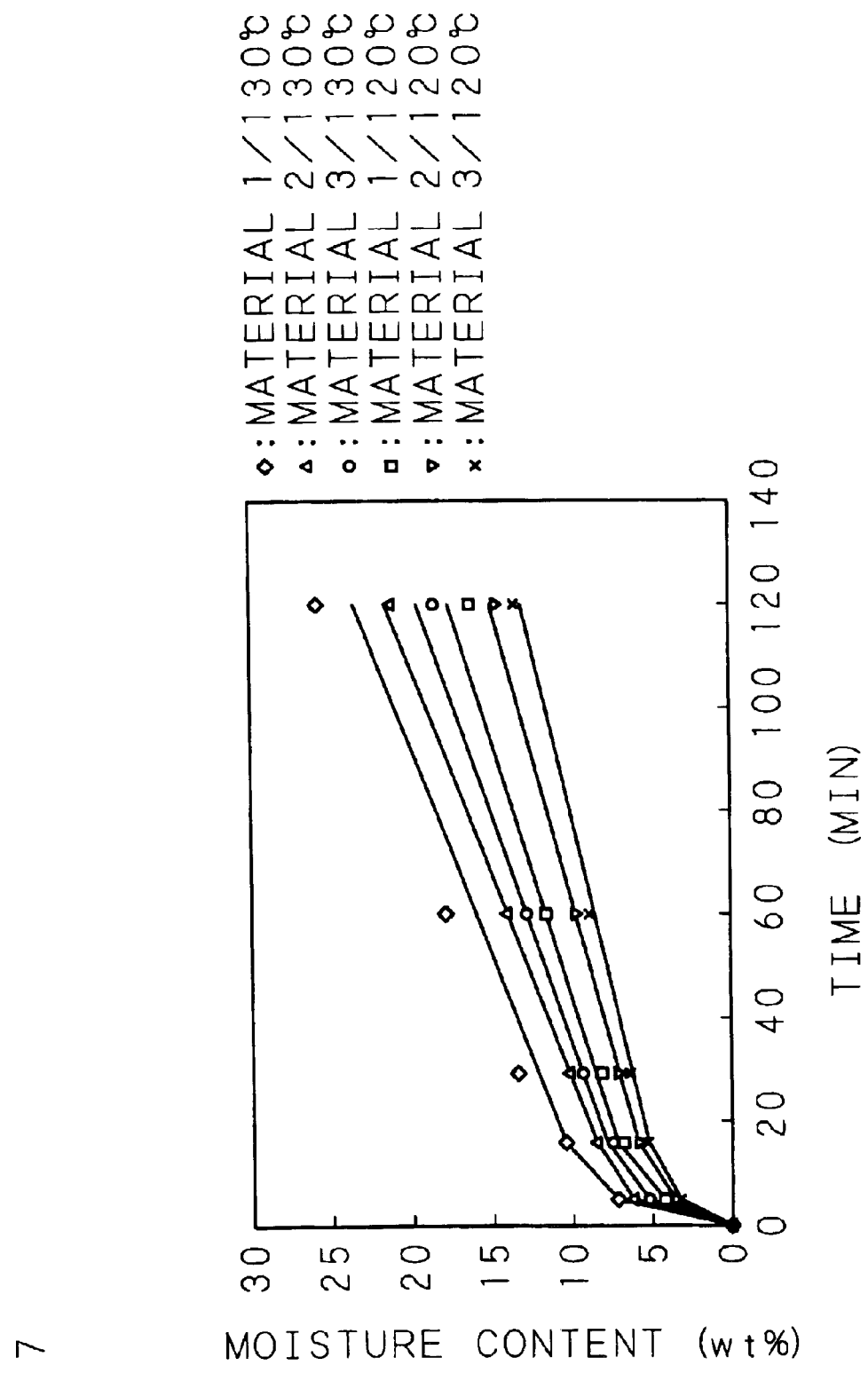
FIG. 7 is a graph showing the characteristics of the intermediate layer whose physical properties are to be calculated by the physical properties calculating apparatus of the present invention.

FIG. 7 is a graph showing the characteristics of the intermediate layer 4 whose physical properties are to be calculated by the physical properties calculating apparatus 10 of the present invention.

FIG. 7 is a graph showing the relation between time and moisture content of the intermediate layer 4 during treatment for each treatment temperature by plotting the time (minute) on the abscissa and plotting the moisture content (wt %) on the ordinate.

Thus, equations (10), (11), (12) and (13) are obtained from the relations found by the experiments.

Further, the relation between time and moisture content of the intermediate layer 4 after end of treatment is calculated, using equation (14) shown below, from the moisture content under equilibrium state, the moisture content just after end of treatment, the water vapor transmission rate of the outer layer 2, the water vapor transmission rate of the inner layer 3, the thickness of the intermediate layer 4, and the density of the intermediate layer 4 (determined by the material).

$$m = m_\infty + (m_o - m_\infty)\exp\left[-\frac{P_i + P_o}{t_{EVOH}d}t\right] \quad (14)$$

where m: moisture content $m_\infty$: moisture content under equilibrium state $m_o$: moisture content just after treatment $P_i$: water vapor transmission rate of the inner layer $P_o$: water vapor transmission rate of the outer layer $t_{EVOH}$: thickness of the intermediate layer d: material (density) of the intermediate layer t: time.

Further, by using equation (15) shown below representing the relation among the moisture content during treatment and after end of treatment, oxygen transmission rate and constants $k_1$, $k_2$, $k_3$ determined by the material, it is possible to calculate the relation between time and oxygen transmission rate, namely the change with time in the oxygen transmission rate, from the relation between the moisture content of the intermediate layer 4 and time calculated using equations (10) and (14).

$$\log_e OTR = k_1\left[-\frac{1}{1+(k_2 m)^2}\right] + k_3 \quad (15)$$

where OTR: oxygen transmission rate m: moisture content $k_1$, $k_2$, $k_3$: constants.

Figure 8:
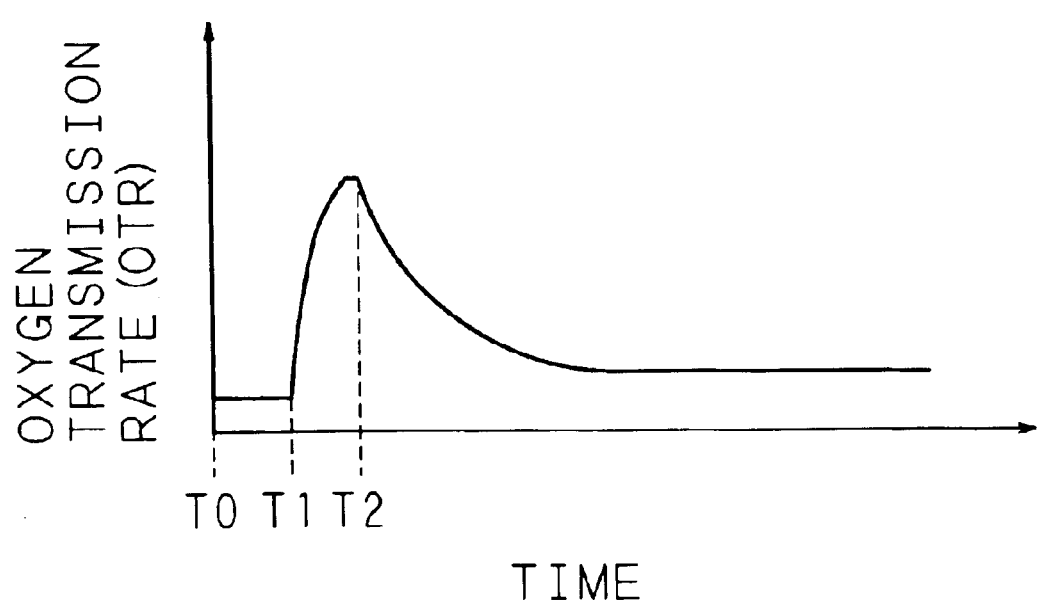
FIG. 8 is a graph showing the change with time in the oxygen transmission rate of the intermediate layer whose physical properties are to be calculated by the physical properties calculating apparatus of the present invention.

FIG. 8 is a graph showing the change with time in the oxygen transmission rate of the intermediate layer 4 whose physical properties are to be calculated by the physical properties calculating apparatus 10 of the present invention.

The graph of FIG. 8 shows the relation between the oxygen transmission rate of the intermediate layer 4 and time t calculated using equation (15) by plotting the time on the abscissa and plotting the oxygen transmission rate on the ordinate.

In FIG. 8, T0 is a time point at which treatment is not performed, T1 is a time point at which treatment, in this case retorting, is started, and T2 is a time point at which treatment ends.

As shown in FIG. 8, the intermediate layer 4 has such a characteristic that the oxygen transmission rate increases abruptly during treatment (retorting) and decreases gradually after the end of treatment (retorting).

Next, the following description will explain the procedure for calculating physical properties by the physical properties calculating apparatus 10 of the present invention.

Figure 9:
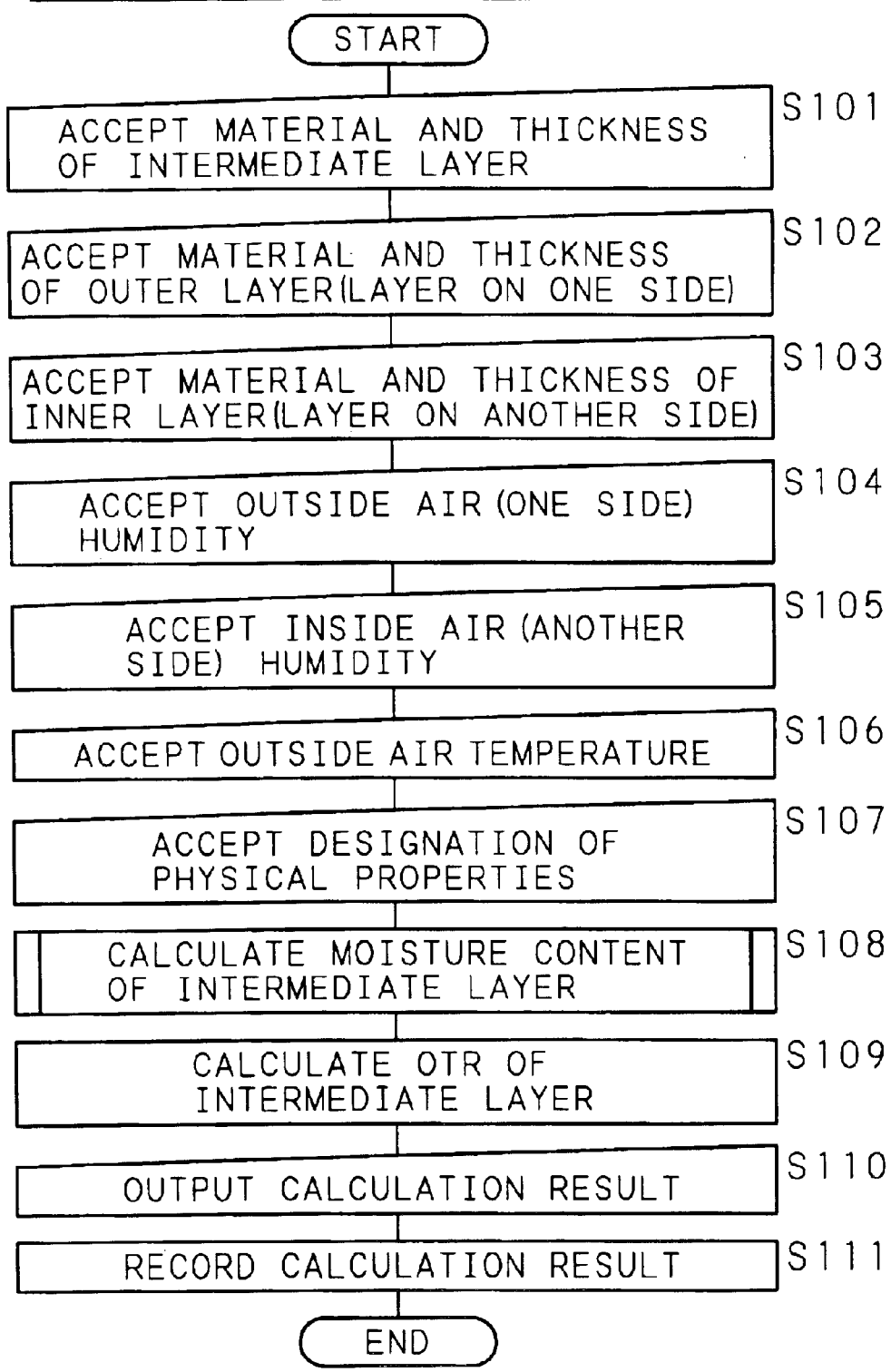
FIG. 9 is a flowchart showing the procedure for calculating the oxygen transmission rate by the physical properties calculating apparatus of the present invention.

FIG. 9 is a flowchart showing the procedure for calculating the oxygen transmission rate by the physical properties calculating apparatus 10 of the present invention.

An operator who operates the physical properties calculating apparatus 10 inputs the material and thickness of the intermediate layer 4 of the packaging material 1, the material and thickness of the outer layer 2, the material and thickness of the inner layer 3, outside air humidity, the humidity of the inside of the packaging material 1, and outside air temperature into the physical properties calculating apparatus 10. Then, the operator designates and inputs a physical property to be calculated by the physical properties calculating apparatus 10, in this case the oxygen transmission rate of the packaging material 1.

As the material of the intermediate layer 4, preset alternatives, such as 38 mol % ethylene content EVOH and 44 mol % ethylene content EVOH, are prepared, and a material is selected from them and inputted.

As the material of each of the outer layer 2 and inner layer 3, a material is selected from alternatives such as polypropylene (PP), high density polyethylene (HDPE), low density polyethylene (LDPE) and Ny6 (Nylon 6), and inputted.

Further, in the case where the outer layer 2 and inner layer 3 have a multilayer structure, a material and a thickness are selected and inputted for each of the layers.

The physical properties calculating apparatus 10 accepts inputs of material and thickness of the intermediate layer 4 (step S101), accepts inputs of material and thickness of the outer layer (layer on one side) 2 (step S102), accepts inputs of material and thickness of the inner layer (layer on the other side) 3 (step S103), accepts an input of outside air humidity (on the one side) (step S104), accepts an input of humidity of the inside (the other side) that is the packaged product side of the packaging material 1 (step S105), accepts an input of outside air temperature (step S106), and accepts the designation of a physical property to be calculated (step S107), from the input unit 15 under the control of the CPU 11 that executes the computer program PG stored in the RAM 14.

Note that the outside air temperature and outside air humidity may be accepted by detecting them by the input unit 15 as a sensor.

Next, the physical properties calculating apparatus 10 calculates the moisture content of the intermediate layer 4 (step S108) by activating a sub-routine (described in detail later) for calculating the moisture content of the intermediate layer 4 based on the accepted various information and preset information, under the control of the CPU 11 that executes the computer program PG stored in the RAM 14. Then, the physical properties calculating apparatus 10, by using equations (8) and (9) described above, calculates the oxygen transmission rate of the intermediate layer 4 (step S109) from the moisture content of the intermediate layer 4 calculated in step S108 and the outside air temperature accepted in step S106, under the control of the CPU 11 that executes the computer program PG stored in the RAM 14.

Note that, at calculating the oxygen transmission rate of the intermediate layer 4 in step S109, it is judged whether the humidity is low humidity or high humidity based on the moisture content calculated in step S108, and one of equations (8) and (9) is selected for use.

Next, the physical properties calculating apparatus 10 outputs from the output unit 16 such as a monitor and a printer the oxygen transmission rate calculated in step S109 as a value indicating a physical property of the intermediate layer 4 (step S110), and stores it as a calculation result in the recording unit 13 (step S111), under the control of the CPU 11 that executes the computer program PG stored in the RAM 14.

Next, the following description will explain the procedure of the sub-routine for calculating the moisture content of the intermediate layer 4, which is activated in step S108.

Figure 10:
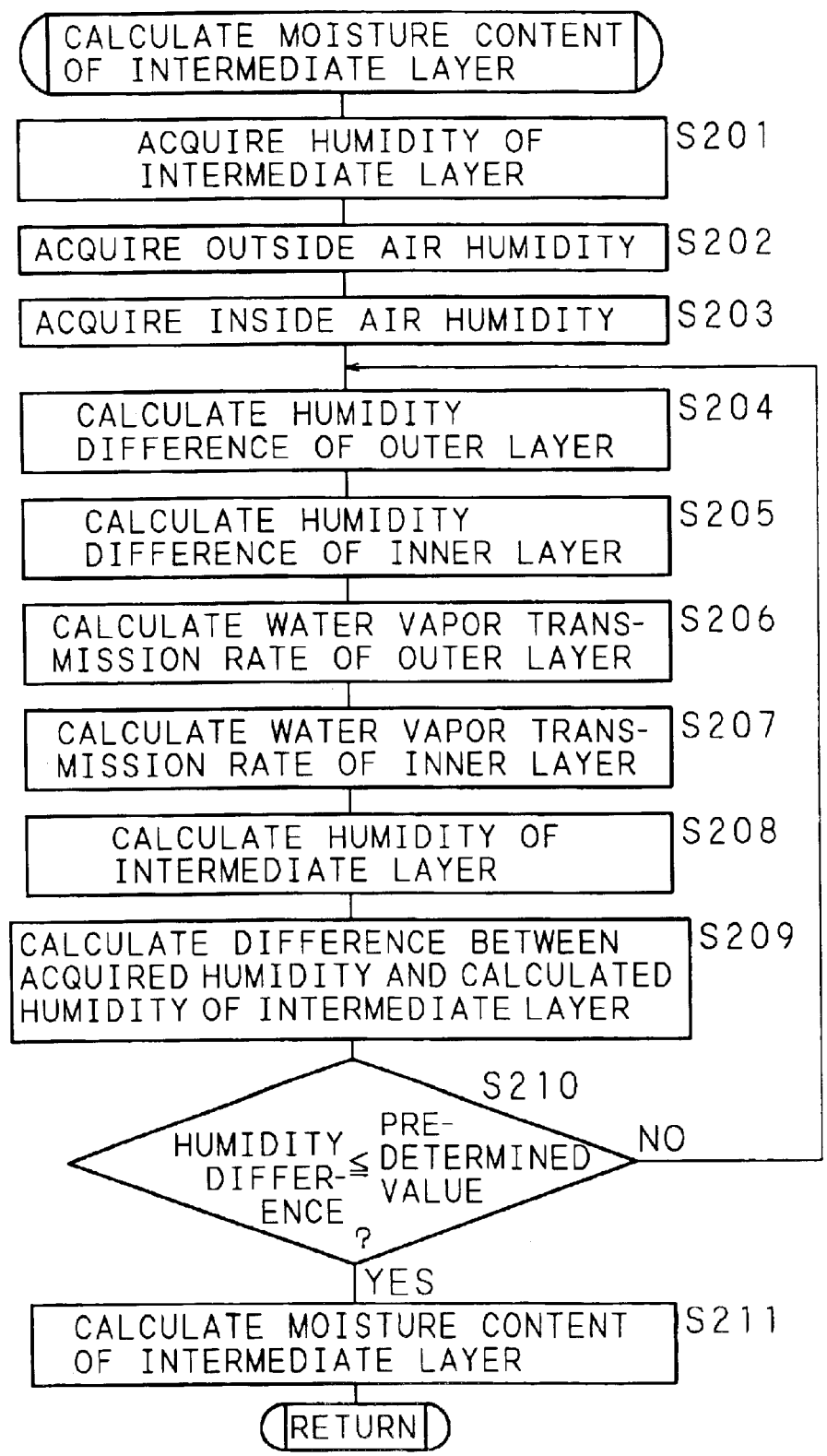
FIG. 10 is a flowchart showing the procedure for calculating the moisture content by the physical properties calculating apparatus of the present invention.

FIG. 10 is a flowchart showing the procedure for calculating the moisture content by the physical properties calculating apparatus 10 of the present invention.

The physical properties calculating apparatus 10 acquires the humidity of the intermediate layer 4 (step S201), acquires the outside air humidity (step S202), and acquires the humidity of the inside of the packaging material 1 (step S203), under the control of the CPU 11 that executes the computer program PG stored in the RAM 14.

The processes of acquiring humidity in steps S201 through S203 are the processes for reading numerical values to be substituted into equations in the RAM 14. More specifically, the process of acquiring the humidity of the intermediate layer 4 in step S201 is the process of reading a value prerecorded as an initial value, for example, "0%". Moreover, the process of acquiring the outside air humidity in step S202 is the process of acquiring the accepted outside air humidity. Further, the process of acquiring the humidity of the inside of the packaging material 1 in step S203 is the process of reading a prerecorded humidity value, for example, "100%", or acquiring the accepted inside humidity.

Next, the physical properties calculating apparatus 10 calculates the absolute value of the difference between the acquired humidity of the intermediate layer 4 and outside air humidity as the humidity difference of the outer layer 2 (step S204), and calculates the absolute value of the difference between the acquired humidity of the inner layer 3 and humidity of the intermediate layer 4 as the humidity difference of the inner layer 3 (step S205), under the control of the CPU 11 that executes the computer program PG stored in the RAM 14.

Next, the physical properties calculating apparatus 10, by using equations (1) and (2) described above, calculates the water vapor transmission rate of each of the outer layer 2 and inner layer 3 (steps S206, S207), under the control of the CPU 11 that executes the computer program PG stored in the RAM 14.

Specifically, the water vapor transmission rate of the outer layer 2 is calculated based on the constants determined by the accepted material, humidity and temperature of the outer layer 2, and preset humidity. On the other hand, the water vapor transmission rate of the inner layer 3 is calculated based on the constants determined by the accepted material, temperature and humidity of the inner layer 3.

Next, the physical properties calculating apparatus 10, by using equations (4) and (5) described above, calculates the humidity (activity) of the intermediate layer 4 (step S208) from the accepted outside air humidity, the calculated water vapor transmission rate of the outer layer 2, the accepted thickness of the outer layer 2, the preset humidity of the inside of the packaging material 1, the calculated water vapor transmission rate of the inner layer 3 and the accepted thickness of the inner layer 3, under the control of the CPU 11 that executes the computer program PG stored in the RAM 14.

Next, the physical properties calculating apparatus 10 calculates the difference between the humidity of the intermediate layer 4 acquired in step S201 and the humidity of the intermediate layer 4 calculated in step S208 (step S209), and compares the calculated humidity difference with a preset predetermined value (step S210), under the control of the CPU 11 that executes the computer program PG stored in the RAM 14.

In step S210, when the calculated humidity difference is judged to be smaller than the preset predetermined value (YES in step S210), the physical properties calculating apparatus 10, by using equations (6) and (7) described above, calculates the moisture content of the intermediate layer 4 (step S211) from the humidity of the intermediate layer 4 calculated in step S208, the accepted outside air temperature and the accepted ethylene composition (ethylene content) representing the material of the intermediate layer 4, under the control of the CPU 11 that executes the computer program PG stored in the RAM 14.

In step S210, when the calculated humidity difference is judged to be larger than the preset predetermined value (NO in step S210), the physical properties calculating apparatus 10 receives the humidity of the intermediate layer 4 calculated in step S208 as the acquired humidity, and then returns to step S204 and repeats the following processes in the same manner as described above, under the control of the CPU 11 that executes the computer program PG stored in the RAM 14.

As described above, by repeatedly performing the processes of step S204 through step S209 in which the humidity of the intermediate layer 4 preset as the initial value and the calculated humidity are compared, and the preset humidity is replaced by the calculated humidity and the calculation of humidity of the intermediate layer 4 is performed again according to the comparison result, the calculated values of humidity of the intermediate layer 4 are converged, and the humidity of the intermediate layer 4 is found. Then, the moisture content of the intermediate layer 4 is calculated based on the found humidity of the intermediate layer 4.

In this manner, the physical properties calculating apparatus 10 of the present invention calculates the moisture content of the intermediate layer 4, and calculates the oxygen transmission rate of the intermediate layer 4 as a physical property of the packaging material 1 from the calculated moisture content.

Next, the following description will explain a process of finding the change with time in the oxygen transmission rate of the intermediate layer 4 of the packaging material 1.

Figure 11A:
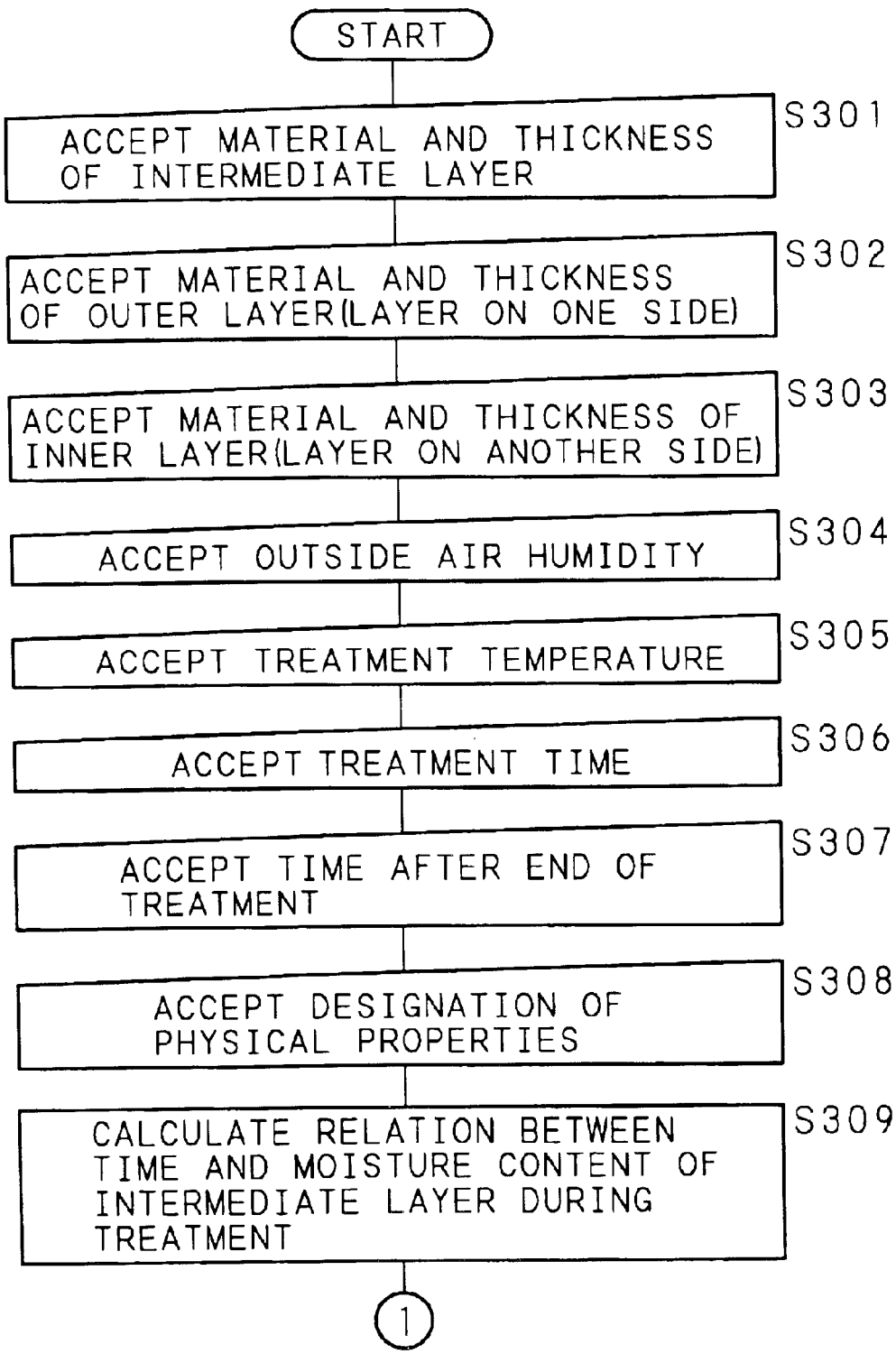
FIG. 11A and FIG. 11B are flowcharts showing the procedure for calculating the change with time in the oxygen transmission rate by the physical properties calculating apparatus of the present invention.
Figure 11B:
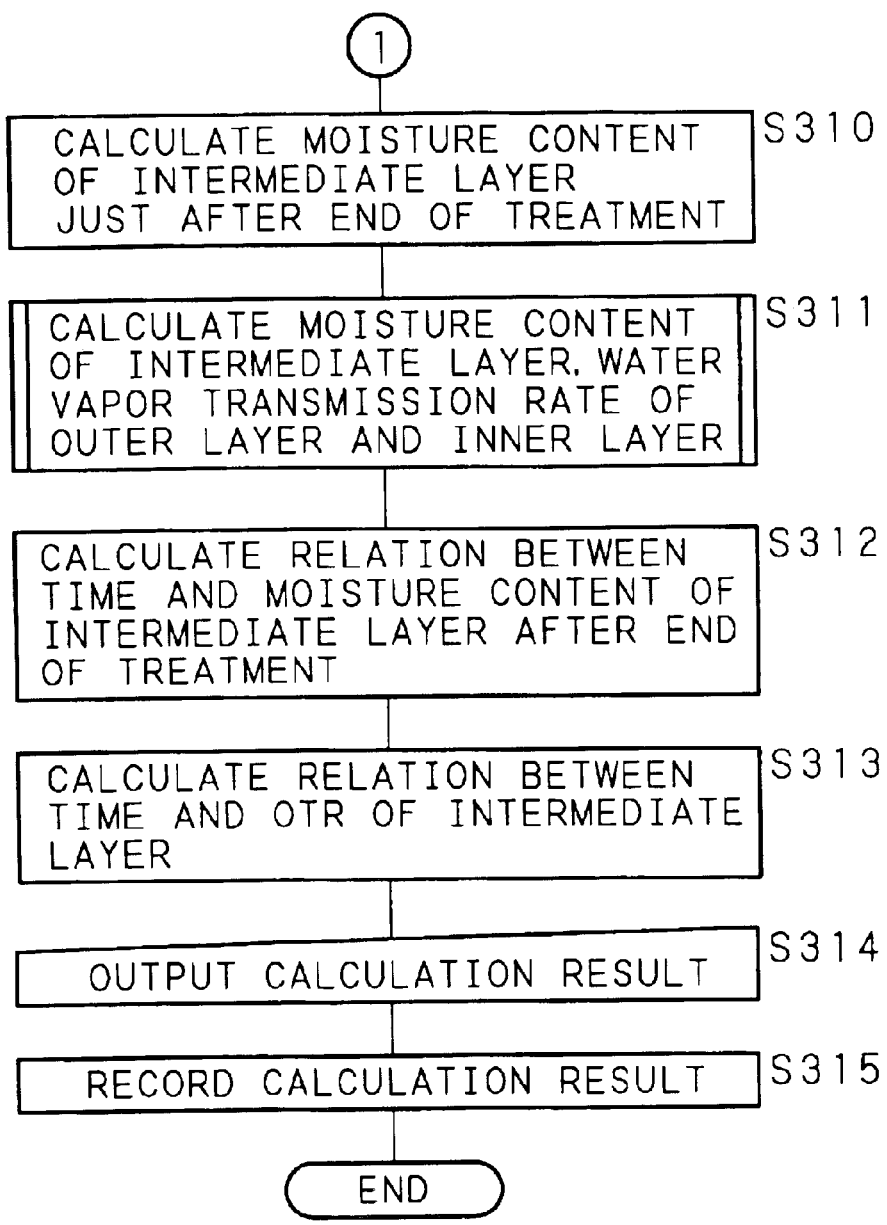

FIG. 11A and FIG. 11B are flowcharts showing the procedure for calculating the change with time in the oxygen transmission rate by the physical properties calculating apparatus 10 of the present invention.

The operator inputs the material and thickness of the intermediate layer 4, the material and thickness of the outer layer 2, the material and thickness of the inner layer 3 of the packaging material 1, outside air humidity, treatment temperature (in this case, the temperature applied during retorting), and treatment time during which treatment is applied into the physical properties calculating apparatus 10. Then, the operator designates and inputs a physical property to be calculated by the physical properties calculating apparatus 10, in this case the change with time in the oxygen transmission rate during treatment of the packaging material 1.

The physical properties calculating apparatus 10 accepts inputs of material and thickness of the intermediate layer 4 (step S301), accepts inputs of material and thickness of the outer layer (layer on one side) 2 (step S302), accepts inputs of material and thickness of the inner layer (layer on the other side) 3 (step S303), accepts an input of outside air humidity (step S304), accepts an input of treatment temperature (step S305), accepts an input of treatment time applied (step S306), accepts an input of time after the end of treatment (step S307), and accepts the designation of a physical property to be calculated (step S308), from the input unit under the control of the CPU 11 that executes the computer program PG stored in the RAM 14.

Regarding the treatment temperature and treatment time, the process values detected from the treatment facility in operation may be accepted as the treatment temperature and treatment time by the input unit 15 as a sensor.

Next, the physical properties calculating apparatus 10, by using equations (10), (11), (12) and (13) described above, calculates the relation between time and moisture content of the intermediate layer 4 during treatment as a function from the accepted thickness of the outer layer 2 or inner layer 3, the accepted thickness of the intermediate layer 4, the treatment temperature and constants determined by the material (step S309), and calculates the moisture content of the intermediate layer 4 just after end of treatment from the calculated relation between time and moisture content, and the accepted treatment time (step S310), under the control of the CPU 11 that executes the computer program PG stored in the RAM 14.

Next, the physical properties calculating apparatus 10 calculates the water vapor transmission rate of the outer layer 2, the water vapor transmission rate of the inner layer 3, and the moisture content of the intermediate layer 4 by activating the sub-routine for calculating the moisture content of the intermediate layer 4 based on the accepted various information and preset information (step S311), under the control of the CPU 11 that executes the computer program PG stored in the RAM 14.

Note that since the sub-routine activated in step S311 to calculate the water vapor transmission rate of the outer layer 2, the water vapor transmission rate of the inner layer 3 and the moisture content of the intermediate layer 4 is the same as the above-described sub-routine for calculating the moisture content of the intermediate layer 4 shown in FIG. 10, reference can be made to FIG. 10 and explanation thereof. Therefore, the explanation of the sub-routine in step S311 is omitted.

Next, the physical properties calculating apparatus 10, by using equation (14) described above, calculates the relation between time after the end of treatment and moisture content (step S312) from the moisture content under equilibrium state calculated as the moisture content of the intermediate layer 4 in step S311, the moisture content just after end of treatment calculated in step S310, the water vapor transmission rate of the outer layer 2 and water vapor transmission rate of the inner layer 3 calculated in step S311, and the accepted thickness of the intermediate layer 4 and the density of the intermediate layer 4 accepted as the material of the intermediate layer 4 in step S301, under the control of the CPU 11 that executes the computer program PG stored in the RAM 14.

Next, the physical properties calculating apparatus 10, by using equation (15) described above, calculates as a function the relation between time and oxygen transmission rate (step S313) from the relation between time and moisture content during treatment calculated in step S309 and the relation between time after end of treatment and moisture content calculated in step S312, under the control of the CPU 11 that executes the computer program PG stored in the RAM 14.

Next, the physical properties calculating apparatus 10 outputs the relation between time and oxygen transmission rate calculated in step S313 as a value indicating the physical property of the intermediate layer 4 from the output unit 16 such as a monitor and a printer (step S314), and records it as the calculation result in the recording unit 13 (step S315), under the control of the CPU 11 that executes the computer program PG stored in the RAM 14.

The relation between time and oxygen transmission rate outputted at this time may have, for example, the shape of the graph shown in FIG. 8.

The embodiment described in detail above illustrates the structure in which the physical properties calculating apparatus 10 of the present invention is mainly used solely. However, the present invention is not limited to this structure, and may be embodied in an apparatus for supporting the process management by connecting the physical properties calculating apparatus 10 to other facility such as the treatment facility through the input unit 15 as a sensor. Moreover, by connecting the physical properties calculating apparatus 10 of the present invention to a communication network such as the Internet, the present invention can be embodied in an apparatus for providing physical property calculation services to personal computers connected to the communication network, and the present invention can also be applied to various other applications.

As described in detail above, according to a method for calculating physical properties, a physical properties calculating apparatus and a computer program product of the present invention, physical properties such as oxygen transmission rate of EVOH for use in an intermediate layer of a packaging material for packaging products to be packaged, such as foods, can be calculated based on conditions, such as the material and thickness of the intermediate layer, the materials and thicknesses of the outer layer and inner layer, humidity and temperature, by using equations showing the relations among them. Consequently, since the physical properties can be known without actually producing samples of packaging material and measuring them, it is possible to support determination of conditions for designing the packaging material and calculate physical properties by taking into account external environmental conditions such as temperature and humidity. Thus, the present invention produces the advantageous effects such as making it possible to know physical properties, taking into account the actual use environment such as in a freezer, a refrigerator or in a room in summer.

Furthermore, according to the present invention, the change with time in the oxygen transmission rate during treatment, such as retorting of the packaging material, and after the end of treatment can be calculated based on the material and thickness of the intermediate layer, the materials and thicknesses of the inner layer and outer layer, temperature and humidity by using equations showing the relations among them. Consequently, since the physical properties can be known without actually producing samples of packaging material and measuring them, the present invention provides the advantageous effects such as supporting determination of conditions for designing the packaging material, and supporting the calculation of a storage period of food as a packaged product, based on the change with time in the oxygen transmission rate when retorting was performed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for calculating physical properties using a physical properties calculating apparatus which comprises inputting means, storing means previously storing equations and constants used for calculating physical properties, and calculating means, and calculates physical properties of an intermediate layer sandwiched between a layer on one side and a layer on other side of a packaging material composed of a plurality of layers, characterized by comprising the steps of:

accepting material and thickness of said layer on one side, material and thickness of said layer on the other side, and humidity and temperature on the one side and the other side, by said physical properties calculating apparatus through said inputting means;

calculating humidity of said intermediate layer by said calculating means of said physical properties calculating apparatus with use of the equations and constants previously storing in said storing means, based on material and thickness of said layer on one side, material and thickness of said layer on the other side, and humidity and temperature on the one side and the other side; and calculating physical properties of said intermediate layer by said calculating means of said physical properties calculating apparatus with use of the equations and constants previously stored in said storing means, based on the calculated humidity of said intermediate layer.

2. A physical properties calculating apparatus for calculating physical properties of an intermediate layer sandwiched between a layer on one side and a layer on other side of a packaging material composed of a plurality of layers, characterized by comprising:

storing means for previously storing equations and constants used for calculating physical properties;

inputting means for accepting material and thickness of said intermediate layer;

inputting means for accepting material and thickness of said layer on one side;

inputting means for accepting material and thickness of said layer on the other side;

inputting means for accepting humidity on the one side;

inputting means for accepting humidity on the other side;

inputting means for accepting outside air temperature; and calculating means for calculating physical properties of said intermediate layer by using the equations and constants previously stored in said storing means, based on the accepted material and thickness of said intermediate layer, the accepted material and thickness of said layer on one side, the accepted material and thickness of said layer on the other side, the accepted humidity on the one side, the accepted humidity on the other side, and the accepted outside air temperature.

3. The physical properties calculating apparatus as set forth in claim 2, characterized in that said calculating means further comprises:

means for calculating a water vapor transmission rate of said layer on one side by using the equations and constants previously stored in said storing means, based on the accepted material of said layer on one side, the accepted humidity on the one side, and the accepted outside air temperature;

means for calculating a water vapor transmission rate of said layer on the other side by using the equations and constants previously stored in said storing means, based on the accepted material of said layer on the other side, the accepted humidity on the other side, and the accepted outside air temperature;

means for calculating humidity of said intermediate layer by using the equations and constants previously stored in said storing means, based on accepted outside air humidity, the calculated water vapor transmission rate and accepted thickness of said layer on one side, preset humidity, and the calculated water vapor transmission rate and accepted thickness of said layer on the other side;

means for calculating a moisture content of said intermediate layer by using the equations and constants previously stored in said storing means, based on the calculated humidity of said intermediate layer, the accepted outside air temperature and the accepted material of said intermediate layer; and means for calculating an oxygen transmission rate of said intermediate layer by using the equations and constants previously stored in said storing means, based on the calculated moisture content of said intermediate layer and the accepted outside air temperature.

4. The physical properties calculating apparatus as set forth in claim 2, characterized by further comprising:

inputting means for accepting a treatment time of said packaging material;

inputting means for accepting a treatment temperature of said packaging material; and inputting means for accepting a time after end of treatment, wherein said calculating means comprises:

means for calculating a relation between time and moisture content of said intermediate layer during treatment of said packaging material by using the equations and constants previously stored in said storing means, based on the accepted material and thickness of said layer on one side or the accepted material and thickness of said layer on the other side, the accepted material and thickness of said intermediate layer, and the accepted treatment temperature;

means for calculating a moisture content of said intermediate layer just after treatment by using the equations and constants previously stored in said storing means, based on the calculated relation between time and moisture content of said intermediate layer during treatment, and the accepted treatment time;

means for calculating a water vapor transmission rate of said layer on one side, based on the accepted material of said layer on one side by using the equations and constants previously stored in said storing means, the accepted humidity on the one side, and the accepted outside air temperature;

means for calculating a water vapor transmission rate of said layer on the other side by using the equations and constants previously stored in said storing means, based on the accepted material of said layer on the other side, the accepted humidity on the other side, and the accepted outside air temperature;

means for calculating humidity of said intermediate layer by using the equations and constants previously stored in said storing means, based on accepted outside air humidity, the calculated water vapor transmission rate and accepted thickness of said layer on one side, the accepted humidity on the other side, the calculated water vapor transmission rate and accepted thickness of said layer on the other side;

means for calculating a moisture content of said intermediate layer by using the equations and constants previously stored in said storing means, based on the calculated humidity of said intermediate layer, the accepted outside air temperature, and the accepted material of said intermediate layer;

means for calculating a relation between time and moisture content of said intermediate layer after end of treatment of said packaging material by using the equations and constants previously stored in said storing means, based on the calculated moisture content of said intermediate layer, the calculated moisture content of said intermediate layer just after treatment, the calculated water vapor transmission rate of said layer on one side, the calculated water vapor transmission rate of said layer on the other side, the accepted thickness of said intermediate layer, the accepted material of said intermediate layer, and the accepted time after end of treatment; and means for calculating a relation between time and oxygen transmission rate of said intermediate layer by using the equations and constants previously stored in said storing means, based on the calculated relation between time and moisture content of said intermediate layer during treatment of said packaging material, and the calculated relation between time and moisture content of said intermediate layer after end of treatment of said packaging material.

5. A physical properties calculating apparatus for calculating physical properties of an intermediate layer sandwiched between a layer on one side and a layer on other side of a packaging material composed of a plurality of layers, comprising processor which is connected to inputting means, and storing means previously storing equations and constants used for calculating physical properties, characterized in that said processor is capable of performing operations of:

causing said inputting means to accept material and thickness of said intermediate layer;

causing said inputting means to accept material and thickness of said layer on one side;

causing said inputting means to accept material and thickness of said layer on the other side;

causing said inputting means to accept humidity on the one side;

causing said inputting means to accept humidity on the other side;

causing said inputting means to accept outside air temperature; and calculating physical properties of said intermediate layer by using the equations and constants previously stored in said storing means, based on the accepted material and thickness of said intermediate layer, the accepted material and thickness of said layer on one side, the accepted material and thickness of said layer on the other side, the accepted humidity on the one side, the accepted humidity on the other side, and the accepted outside air temperature.

6. The physical properties calculating apparatus as set forth in claim 5, characterized in that said processor is further capable of performing operations of:

calculating a water vapor transmission rate of said layer on one side by using the equations and constants previously stored in said storing means, based on the accepted material of said layer on one side, the accepted humidity on the one side, and the accepted outside air temperature;

calculating a water vapor transmission rate of said layer on the other side by using the equations and constants previously stored in said storing means, based on the accepted material of said layer on the other side, the accepted humidity on the other side, and the accepted outside air temperature;

calculating humidity of said intermediate layer by using the equations and constants previously stored in said storing means, based on accepted outside air temperature, the calculated water vapor transmission rate and accepted thickness of said layer on one side, preset humidity, and the calculated water vapor transmission rate and accepted thickness of said layer on the other side;

calculating a moisture content of said intermediate layer by using the equations and constants previously stored in said storing means, based on the calculated humidity of said intermediate layer, the accepted outside air temperature, and the accepted material of said intermediate layer; and calculating an oxygen transmission rate of said intermediate layer by using the equations and constants previously stored in said storing means, based on the calculated moisture content of said intermediate layer, and the accepted outside air temperature.

7. The physical properties calculating apparatus as set forth in claim 5, characterized in that said processor is further capable of performing operations of:

causing said inputting means to accept a treatment time during which treatment is applied on said packaging material;

causing said inputting means to accept a treatment temperature applied on said packaging material; and causing said inputting means to accept a time after end of treatment, wherein the operation of calculating the oxygen transmission rate further includes operations of:

calculating a relation between time and moisture content of said intermediate layer during treatment of said packaging material by using the equations and constants previously stored in said storing means, based on the accepted material and thickness of said layer on one side or the accepted material and thickness of said layer on the other side, the accepted material and thickness of said intermediate layer, and the accepted treatment temperature;

calculating a moisture content of said intermediate layer just after end of treatment by using the equations and constants previously stored in said storing means, based on the calculated relation between time and moisture content of said intermediate layer during treatment, and the accepted treatment time;

calculating a water vapor transmission rate of said layer on one side by using the equations and constants previously stored in said storing means, based on the accepted material of said layer on one side, the accepted humidity on the one side, and the accepted outside air temperature;

calculating a water vapor transmission rate of said layer on the other side by using the equations and constants previously stored in said storing means, based on the accepted material of said layer on the other side, the accepted humidity on the other side, and the accepted outside air temperature;

calculating humidity of said intermediate layer by using the equations and constants previously stored in said storing means, based on accepted outside air humidity, the calculated water vapor transmission rate and accepted thickness of said layer on one side, the accepted humidity on the other side, the calculated water vapor transmission rate and accepted thickness of said layer on the other side;

calculating a moisture content of said intermediate layer by using the equations and constants previously stored in said storing means, based on the calculated humidity of said intermediate layer, the accepted outside air temperature, and the accepted material of said intermediate layer;

calculating a relation between time and moisture content of said intermediate layer after end of treatment of said packaging material by using the equations and constants previously stored in said storing means, based on the calculated moisture content of said intermediate layer, the calculated moisture content of said intermediate layer just after treatment, the calculated water vapor transmission rate of said layer on one side, the calculated water vapor transmission rate of said layer on the other side, the accepted thickness of said intermediate layer, the accepted material of said intermediate layer, and the accepted time after end of treatment; and calculating a relation between time and oxygen transmission rate of said intermediate layer by using the equations and constants previously stored in said storing means, based on the calculated relation between time and moisture content of said intermediate layer during treatment of said packaging material, and the calculated relation between time and moisture content of said intermediate layer after end of treatment of said packaging material.

8. A computer program product for use with a computer system including inputting means, and storing means previously storing equations and constants used for calculating physical properties, characterized by comprising:

a computer usable storage medium having a computer readable program code embodied therein for calculating physical properties of an intermediate layer sandwiched between a layer on one side and a layer on other side of a packaging material composed of a plurality of layers, said computer readable program code comprising:

causing a computer to accept through said inputting means material and thickness of said intermediate layer;

causing a computer to accept through said inputting means material and thickness of said layer on one side;

causing a computer to accept through said inputting means material and thickness of said layer on the other side;

causing a computer to accept through said inputting means humidity;

causing a computer to accept through said inputting means temperature; and causing a computer to calculate physical properties of said intermediate layer by using the equations and constants previously stored in said storing means, based on the accepted material and thickness of said intermediate layer, the accepted material and thickness of said layer on one side, the accepted material and thickness of said layer on the other side, and the accepted humidity and temperature.

* * * * *